United States Patent [19]
Greene

[11] Patent Number: 5,162,455
[45] Date of Patent: Nov. 10, 1992

[54] COPOLYETHERESTER ELASTOMER

[75] Inventor: Robin N. Greene, Rockland, Del.

[73] Assignee: E. I. Du Pont De Nemours and Company, Wilmington, Del.

[21] Appl. No.: 773,201

[22] Filed: Oct. 8, 1991

[51] Int. Cl.$^5$ .............................. C08F 20/00
[52] U.S. Cl. ..................... 525/437; 525/444; 525/471; 525/540; 528/272; 528/300; 528/301; 528/302; 528/308.6; 528/310; 528/335; 528/350; 428/364
[58] Field of Search ............... 525/437, 444, 471, 540; 528/272, 300, 301, 302, 308.6, 310, 335, 350; 428/364

[56] References Cited

U.S. PATENT DOCUMENTS

| | | | |
|---|---|---|---|
| 3,023,192 | 2/1962 | Shivers | 528/300 |
| 4,731,435 | 3/1988 | Greene et al. | 525/432 |
| 4,769,441 | 9/1988 | Jackson, Jr. et al. | 528/342 |
| 4,810,770 | 3/1989 | Greene et al. | 525/432 |
| 4,828,927 | 5/1989 | Timmerman et al. | 428/480 |
| 4,906,729 | 3/1990 | Greene et al. | 528/272 |
| 5,102,978 | 4/1992 | Richard, Jr. | 528/272 |

Primary Examiner—John Kight, III
Assistant Examiner—Sam A. Acquah

[57] ABSTRACT

A thermoplastic, segmented, linear copolyetherester elastomer with soft segments derived from poly(alkylene oxide) glycol and hard segments of poly(1,2-ethylene terephthalate) or poly(1,4-butylene terephthalate) contains very small amounts of certain bifunctional units. Preferred units are derived from trans-1,4-cyclohexylene-bis-(N-trimellitimide) and p-phenylene-bis-(N-trimellitimide). Fibers of the elastomer have non-tacky characteristics and improved elastic properties.

5 Claims, 5 Drawing Sheets

COPOLYETHERESTER ELASTOMER

BACKGROUND OF THE INVENTION

1. Field of the Invention

This invention relates to a thermoplastic, segmented, linear copolyetherester elastomer having soft segments derived from a poly(alkylene oxide) glycol and hard segments derived from poly(ethylene terephthalate) or poly(butylene terephthalate). More particularly, the invention concerns such elastomers in which the elastomer chains include a small amount of specific difunctional groups, referred to herein as —Q— units.

2. Description of the Prior Art

Thermoplastic elastomers of segmented, linear copolyetheresters are well known. For example, Shivers, U.S. Pat. No. 3,023,192, among many others, discloses such elastomers composed of long chain ester units which form "soft segments" of the elastomer and short chain ester units which form "hard segments". Among the numerous segments that have been suggested, are soft segments derived from poly(alkylene oxide) glycol (e.g., poly(tetramethylene oxide) glycol, optionally copolymerized with 3-methyltetrahydrofuran) and hard segments of poly(ethylene terephthtalate) and/or poly(1,4-butylene terephthalate). For use in elastic fibers or films, the soft segments usually amount to at least 70 percent of the elastomer weight. Although such elastomers have utility they also have certain shortcomings. For example, such elastomers with hard segments derived from poly(ethylene terephthtalate) are difficult to melt spin into fibers; the elastomer usually crystallizes too slowly and is too tacky to permit satisfactory conversion into fibers or films at commercially viable speeds. Such elastomers with hard segments derived from poly(1,4-butylene terephthalate) crystallize well, but usually need improvements in elastic properties, particularly in set and unload power. Greene et al, U.S. Pat. No. 4,906,729, discloses some techniques for alleviating these shortcomings. However, further improvements are desirable. An object of this invention is to further improve such copolyetherester elastomers so that they can be converted readily into fibers or films that have a desirable combination of elastic properties.

Though not concerned with copolyetherester elastomers having soft segments derived from a poly(alkylene oxide) glycol and hard segments derived from poly(ethylene terephthtalate) or poly(1,4-butylene terephthtalate), Greene et al, U.S. Pat. Nos. 4,731,435 and 4,810,770, disclose elastomers prepared from certain high molecular weight, relatively rigid, difunctional compounds which amount to 5-25 percent of the elastomer weight. The present inventor has found that by incorporating unusually small quantities of such large difunctional compounds into the elastomers of the present invention, useful improvements are made to the elastomer.

SUMMARY OF THE INVENTION

The present invention provides an improved thermoplastic, segmented, linear copolyetherester elastomer of the type that consists essentially of a multiplicity of recurring intralinear long-chain and short-chain ester units connected head-to-tail through ester linkages. The long-chain ester units amount to at least 70 percent by weight of the elastomer and are poly(alkylene oxide)-terephthalate units and the short-chain ester units amount to 10 to 30 percent by weight of the elastomer and are units of poly(1,2-ethylene terephthalate) and/or poly(1,4-butylene terephthalate). The improved elastomer is characterized in that the hard segments include difunctional organic units —Q—, in an amount in the range of 0.1 to 2 percent of the total weight of the elastomer (preferably 0.5 to 1.5%), with —Q— being selected from the group consisting of units (a), (b), (c), (d) and (e), wherein (a) is a structural unit —Y—X—Z—, wherein —Y— and —Z— are the same or different and are selected from the divalent radicals and —X— is a divalent organic radical consisting of a chain of at least three ring structures, optionally connected by trans-amide, carbonyl, trans-vinylene, azo (i.e., —N=N—), or azomethine i.e., —HC=N—) linkages, having a shortest distance of at least 11 angstroms between centers of its terminal junctions, as measured from a Dreiding model laid flat, and when —X— is in the compound the compound has a melting point of at least 225° C.,

(b) is derived from a bis-(N-trimellitimide) of the structural formula —G—R—G—, wherein G is derived from a divalent trimellitimide unit and R is selected from $(CH_2)_n$ wherein n is 0, 1 or 2,
m-phenylene
dimethyl-di-p-phenylenemethane, and (c) is a divalent residue of the reaction of a 1:2 molar ratio of t-1,4-cyclohexanedimethanol and dimethyl terephthalate, (d) is a divalent residue of the reaction of a 1:2 molar ratio of bis-(N-ethanolphthalimide)ketone and dimethylterephthalate, having the structural formula (e) is a divalent residue of the reaction of a 1:1 molar ratio of p-aminobenzoic acid and dimethylterephthalate, and (f) is a divalent residue of the reaction of a 1:1 molar ratio of p-aminobenzoic acid and trimellitic anhydride.

The polymer chains of preferred elastomers include —Q— units derived from p-phenylene-bis-(N-trimellitimide) or from t-1,4-cyclohexylene-bis-(N-trimellitimide) (i.e., formulas I and XIII respectively, below). The invention also provides processes for preparing the copolyether elastomer with —Q— units that are formed in situ during polymerization reactions.

The improved elastomers are particularly useful for conversion into fibers or films, which are suited for diaper-leg elastification, among other things.

BRIEF DESCRIPTION OF THE DRAWINGS

The invention will be better understood by reference to the drawings, in which.

The elastomers of FIG. 1-3 have poly(1,2-ethylene terephthalate) hard segments and those of FIG. 4-9 have poly(1,4-butylene terephthalate) hard segments.

The effectiveness of different —Q— units is compared in FIG. 8.

The effect of —Q— unit concentration is shown in FIG. 9.

DETAILED DESCRIPTION OF PREFERRED EMBODIMENTS

The invention is further illustrated by the following descriptions of preferred embodiments. These are included for the purposes of illustration and are not intended to limit the scope of the invention, which is defined by the appended claims.

In accordance with the present invention, the long chain ester units, or "soft segments", of the elastomers are made by conventional techniques of reacting terephthalic acid with long chain glycol, usually a poly(alkylene oxide) glycol or mixtures of such glycols. The poly(alkykene oxide) glycol usually has a molecular weight in the range of 1,500 to 5,000, preferably 2,000 to 4,000.

Poly(alkykene oxide) glycols suitable for the preparation of elastomers of the invention generally have a carbon-to-oxygen mole ratio in the range of 2 to 4.3. Representative poly(alkykene oxide) glycols include poly(ethylene oxide) glycol, poly(propylene oxide) glycol, poly(tetramethylene oxide) glycol (also known as polymerized tetrahydrofuran) and random or block copolymers thereof. When copolymers of poly(ethylene oxide) glycol and poly(tetramethylene oxide) glycol are employed, the poly(tetramethylene oxide) glycol content can be as little as 20%, though copolymers having at least 50% of poly(tetramethylene oxide) glycol are more usual. When copolymers of tetrahydrofuran with minor amounts of 3-methyltetrahydrofuran are employed, the 3-methyltetrahydrofuran content of the copolymer is usually in the range of 7 to 15 percent.

The conventional portion of the short chain ester units, or "hard segments", of the elastomer of the invention are polyesters that can be formed by the reaction of terephthalic acid and 1,2-ethane diol or 1,4-butane diol. Thus, the short chain ester units consist essentially (i.e., at least 95 weight percent) of poly(1,2-ethylene terephthalate) or poly(1,4-butylene terephthalate). Usually, the hard segments of the elastomers of the invention constitute 10 to 30 percent by weight of the total elastomer. Preferably, the hard segment amount to 15 to 25%.

The improvement of the present invention requires the molecular chain of the elastomer to have incorporated therein 0.1 to 2 %, preferably 0.5 and 1.5 %, and most preferably no more than 1.2%, (based on the total weight of the elastomer) of specific difunctional units, "—Q—", which are selected from the group of units designated herein as "(a), (b), (c), (d), (e) and (f)". The —Q— units can be residues of diacids, diols, diamines, hydroxyacids and amino acids. Such compounds and methods of preparing them are known and are illustrated in the examples below. Units (c), (d), (e) and (f) can be prepared in situ as part of the elastomer polymerization process.

The —Q— units included in (a) are each rigid difunctional groups of the structural formula —Y—X—Z—, wherein —Y— and —Z— are the same or different and are selected from the divalent radicals and —X— is a divalent organic radical consisting of a chain of at least three ring structures, optionally connected by trans-amide, carbonyl, trans-vinylene, azo or azomethine linkages, having a shortest distance of at least 11 Angstroms between centers of its terminal junctions, as measured from a Dreiding model laid flat, and when —X— is in the compound the compound exhibits a melting point of at least 225° C. The ring structures are divalent and may be substituted, but preferably are not substituted. Suitable divalent ring structures include the residues of p-phenylene-, p,p'-biphenylene-, trans-1,4-cyclohexylene- and 2,6-naphthalene-bis(trimellitimide). The method of measuring Dreiding model distances is known in the art and is described in Andre S. Dreiding, Helv. Chim. Acta 42, 1339 (1959). Dreiding models can be constructed conveniently from kits obtained from Brinkman Instruments Inc., Cantiague Road, Westbury, N.Y. The terminal junctions are the ring carbon atoms of —X— that are attached to the functional —Y— of —Z— groups. Greene et al, U.S. Pat. No. 4,731,435, column 4, lines 8-21, describes a method for preparing the dibutyl esters of —X—, which description is hereby incorporated by reference. The melting point of a dibutyl ester of —X— is measured with a Du Pont Model 9900 Differential Scanning Calorimeter by the general methods described in B. Wunderlich, "Thermal Analysis", Rensselaer Polytechnic Institute (1981) and is defined as the temperature at the lowest point of the endotherm of transition to an isotropic melt.

Several —Y—X—Z— difunctional units, suitable for use in the present invention are as follows:

(I)

(II)

(III)

(IV)

(V)

(VI)

(VII)

(VIII)

(IX)

(X)

(XI)

(XII)

and (XIII)

Additional (a) units are disclosed in Greene et al, U.S. Pat. No. 4,731,435, column 7, lines 8, through column 9, line 18, which description is hereby incorporated by reference. Two preferred (a) units are residues derived from trans-1,4-cyclohexylene-bis-(N-trimellitimide) and p-phenylene-bis-(N-trimellitimide). The residue of trans-1,4-cyclohexylene-bis-(N-trimellitimide) is particularly preferred because it can provide a colorless elastomer, whereas other difunctional diimide units suitable for use in the invention can lead to some coloration of the elastomer.

The difunctional —Q— units selected from units (b) are bis-(N-trimellitimide) units, that have the structure —G—R—G—, wherein —G— is derived from a trimellitimide group. The two trimellitimide groups may be directly connected to each other, in which case they form a simple difunctional bis-(N-trimellitimide) group. Connecting —R— groups can be selected from methylene (i.e., —CH₂—), ethylene (i.e., —C₂H₅—), m-phenylene, dimethyl-di-p-phenylenemethane and The difunctional —Q— unit can also be selected from the following materials, added as described above, or produced in situ with other reactants during the polymerization process. The reactants that produce the residues which form divalent —Q— radicals, identified above as units (c), (d), (e) and (f), are as follows. Unit (c) is formed from the reaction of a 1:2 molar ratio of trans-1,4-cyclohexanedimethanol and dimethylterephthalate; unit (d), from the reaction of a 1:2 molar ratio of bis-(N-ethanolphthalimide)ketone and dimethylterephthalate; unit (e), from the reaction of a 1:1 molar ratio of p-aminobenzoic acid and dimethylterephthalate; and unit (f) from the reaction of a 1:1 molar ratio of p-aminobenzoic acid and trimellitic anhydride.

The elastomers of the invention can be made conveniently by starting with a conventional ester interchange reaction. For example, the dimethyl ester of terephthalic acid can be heated with a long chain glycol, an excess of diol (e.g., 1,4-butane diol) and a small amount of branching agent, if desired, in the presence of a catalyst at a temperature in the range of 150° to 260° C., with methanol, formed by the ester interchange, being distilled off. Depending on the temperature, catalyst, glycol excess and particular equipment used, the reaction can be completed within a few minutes to a few hours. This procedure yields a prepolymer which can be increased in molecular weight by the procedure described below.

The prepolymers of the preceding paragraph also can be prepared by other known methods of esterification or ester interchange. For example, the long chain glycol can be reacted with a high or low molecular weight short chain ester homopolymer or copolymer in the presence of catalyst until randomization occurs. Also, the short chain ester homopolymer or copolymer can be prepared (a) by ester interchange from free acids with diol acetates, (b) by direct esterification from suitable acids, anhydrides, or acid chlorides, for example, with diols, or (c) by other processes, such as reaction of suitable acids with cyclic ethers or carbonates. The prepolymer also can be prepared by these reactions in the presence of the long chain glycols.

The prepolymers described in the preceding paragraphs can be increased to higher molecular weights by distillation of excess diol in known polycondensation methods. Additional ester interchange occurs during the polycondensation or distillation. The distillation increases the molecular weight and randomizes the arrangement of copolyester units. Best results usually are obtained by performing the final polycondensation or distillation at a pressure below 5 mm of Hg and at a temperature in the range of 220°-260° C. for less than six hours (e.g., 0.5 to 5 hours) in the presence of conventional antioxidants. Most practical polymerization techniques rely upon ester interchange to complete the polymerization reaction. To avoid excessively long periods at high temperatures, with attendant possible thermal degradation, a catalyst for the ester interchange reaction can be employed.

If desired, as for example to raise the melt viscosity of the elastomer, a branching agent can be included in the polymerization mix, as disclosed by Hoeschele, U.S. Pat. No. 4,205,158, column 3, lines 35 through 66.

Ester interchange polymerizations generally are performed in the melt without any solvent. However, inert solvents can be used to facilitate removal of volatile components from the polymerization mix. This technique is especially useful in making prepolymer by direct esterification. Polycondensation of prepolymer can also be accomplished in the solid phase by heating particles of solid prepolymer in a vacuum or in a stream of inert gas to liberate and remove low molecular weight diol.

The processes described above can be performed as batch or continuous processes. Continuous polymerization by ester interchange with a prepolymer is a preferred and established commercial method.

Conventional additives can be incorporated into the elastomers of this invention by known techniques. Such additives include antioxidants, ultraviolet light stabilizers, inorganic fillers, pigments, and the like.

The term "dicarboxylic acid", terephthalic acid, and other such acids, as used herein, includes equivalents of the acids having two functional groups which perform substantially as do dicarboxylic acids in reaction with glycols and diols in forming copolyetherester polymers. Such equivalents include esters and ester-forming derivatives.

The elastomers of the invention can be conveniently converted into shaped articles by conventional techniques. For example, the elastomer can be melt-spun into filaments, by extruding the elastomer through spinneret orifices at a temperature in the range of 180° to 220° C. and then winding up the filaments, with or without drawing. Elastic properties of the filaments usually are improved by conventional drawing (e.g., at draw ratios of 2:1 to 4:1) as well as by conventional relaxed boil-off heat treatments (i.e., exposure in a non-tensioned condition in boiling water for 20-30 minutes).

The present inventor found that the wind-up and unwind properties of the filaments made from elastomers of the invention having poly(ethylene terephthalate) hard segments that contained —Q— units are much superior to filaments made from similar elastomers having no such —Q— units. The stickiness, tackiness and over-end take-off tension of the as-spun filaments in accordance with the invention is decreased considerably by the presence of the —Q— units. In some cases, filaments without the —Q— units cannot be wound up satisfactorily, unless large quantities of spin finish and slow windup speeds are employed to prevent fusion of the filaments. Filament fusion makes practical backwinding near impossible. In contrast, substantially all as-spun filaments of the invention can be wound up and back wound satisfactorily. In elastomers of the invention having poly(butylene terephthalate) hard segments, the inclusion of —Q— units in the hard segments provides improvements in the elastic stress-strain and recovery characteristics of fibers made from the elastomer.

TEST PROCEDURES

Various characteristics and properties of the elastomers mentioned in the preceding discussion and in the Examples below were determined by the following test procedures.

Inherent viscosity, in deciliters per gram (dL/g) is determined in accordance with W. R. Sorenson and T. W. Campbell, "Preparative Methods of Polymer Chemistry", Interscience Publishers, 2nd Ed. (1968) p. 44. A solution of 0.5 gram of polymer in 100 ml of m-cresol at 30° C. is used. In the Examples, samples for inherent viscosity determinations were taken from the threadline initially emerging from the spinneret.

The concentration of the hard segment in the polymer is calculated by the following formula, $$\%HS = \text{weight percent hard segment} = \frac{100(M_{hs})[(w_1/M_1) - (w_2/M_2)]}{(M_{hs})[(w_1/M_1) - (w_2/M_2)] + (M_{ss})(w_2/M_2)}$$

wherein
 w is weight,
 M is molecular weight and
 subscript
  hs refers to hard segment (short chain ester)
  ss refers to soft segment (long chain ester)
  refers to the dimethyl ester of the starting diacid and
  2 refers to the long chain glycol.

Note that the weight of the long chain glycol in the formula must have the weight of inert oligomeric cyclic ethers subtracted from the total weight of the glycol.

Oligomeric ethers usually amount to about 2% by weight in poly(tetramethylene oxide) glycol.

Number average molecular weight of the glycol is determined by reacting the glycol with an excess of acetic anhydride in pyridine and then back-titrating with sodium hydroxide to measure the amount of acetic acid produced and calculating the molecular weight therefrom.

Tenacity at break, T, and stress, S, are measured in grams per denier and elongation at break, E, is measured in percent on an Instron Tester equipped with Series 2712 (002) pneumatic Action Grips in accordance with ASTM Method D 2653-72, "Standard Test Method for Breaking Load and Elongation of Elastomeric Yarns".

"Unload power", UP, is measured in milligrams per denier in accordance with the general method of ASTM D 2731-72, "Standard Test Method for Elastic Properties of Elastomeric Yarns". Three filaments, a 2-inch (2.5-cm) gauge length and a zero-to-300% elongation cycle are used for each determination. Unload power (i.e., the stress at a particular elongation) is measured after the samples have been cycled five times at a constant elongation rate of 800% per minute and then held at the 300% extension for half a minute after the fifth extension. While unloading from this last extension, the stress, or unload power, is measured at elongations of 60 and 100%, and are respectively designated $UP_{60}$ and $UP_{100}$.

The % set also was measured in accordance with the method of ASTM Method D 2731-72.

As reported herein, T, E and UP represent the data for best individual filaments and % Set is the average of three determinations. Tenacity, stress and unload power in grams per denier (gpd) are converted to deciNewtons per tex (dN/tex) by multiplying gpd by 0.883.

For convenience, several abbreviations are employed in the examples, as follows:
- 2GT—hard segment formed from ethylene glycol (2G) and terephthalic acid (T)
- 4GT—hard segment formed from 1,4-butane diol (4G) and terephthalic acid
- EDA—ethylene diamine
- PO2G—poly(ethylene oxide) glycol
- PO4G—poly(tetramethylene oxide) glycol, also known as polymerized THF
- THF—tetrahydrofuran
- MeTHF—3-methyltetrahydrofuran
- DMT—dimethyl terephthalate
- TMA—trimellitic acid anhydride
- TBT—tetrabutyl titanate esterification catalyst
- BSA—butyl stannoic acid
- AO-330—1,3,5-trimethyl-2,4,6-tris[3,5-di-t-butyl-4-hydroxy-benzyl]benzene antioxidant sold by Ethyl Corp.
- SS—soft segment of elastomer
- HS—hard segment of elastomer
- %HS—percent hard segment (based on total weight of elastomer)
- MW—molecular weight
- DR—draw ratio Copolymer soft segments formed from poly(ethylene oxide) glycol and poly(tetramethylene oxide) glycol are abbreviated PO2/PO4-G; those formed from copolymers of tetrahydrofuran and 3-methyltetrahydofuran are abbreviated THF/MeTHF. The ratio of the two ingredients of the copolymer usually is indicated in parentheses immediately following the abbreviation, e.g., PO2/-PO4 (50/50), and is a molar ratio, unless stated otherwise.

EXAMPLES

The examples which follow are intended to illustrate, but not limit, the invention, which is defined by the claims appended hereto. The results reported in these examples are believed to be representative, but do not constitute all the runs involving the indicated ingredients. In the Examples, Tables and Figures, samples identified with Arabic numerals are of the invention and those identified with upper-case letters, are comparison samples which are outside the invention.

The Examples describe the production and physical properties of filaments made from a variety of elastomers that have 2GT or 4GT hard segments and small amounts of —Q— units in the elastomer chains. The elastomers and filaments of the invention are compared to elastomers and filaments of substantially the same composition, but which are outside the invention because they include no —Q— units in the elastomer chains.

GENERAL PROCEDURE

In each of the Examples, the following general procedures were used, except for minor differences in temperatures and/or ester interchange catalyst. Usually, temperatures higher than 260° C. were avoided. At such high temperatures, the rate of polymer degradation begins to compete with the rate of polymerization.

To start the preparation, a 300-cm$^3$ kettle, equipped for distillation, was charged with the particular ingredients listed in each example. A stainless steel stirrer, fitted with a paddle shaped to conform with the internal dimensions of the kettle, was positioned about 0.3 cm (⅛ inch) above the bottom of the kettle. Stirring was started and continued for about two hours while the kettle was heated for about two hours in a Woods metal bath operating at temperature of about 244° C., during which time the ingredient providing the —Q— units, if present, dissolved and methanol distilled from the mix. The pressure on the system was then reduced to 0.1 mm of mercury over the course of about two hours. Distillation was continued at the reduced pressure for about one hour. The resulting viscous molten product was removed from the kettle, allowed to cool and solidify. Comparison samples were prepared by the same procedures, except that the ingredient supplying the —Q— units was omitted and the initial time period before application of vacuum was decreased to about 45 minutes.

To melt-spin the elastomer into filaments, a cylindrical cell was employed. The cell had a 2.2-cm (⅞-inch) inside diameter and 12.7-cm (5-inch) length, and was equipped with a hydraulically driven ram that was inserted into the cylinder atop an elastomer sample. The ram had a replaceable "Teflon" tip that fit snugly inside the cell. An annular electric heater surrounded the lower quarter of the cell and was used to control cell temperature, which was recorded by a thermocouple located inside the cell heater. Attached to the bottom of the cell was a spinneret, the interior of which included a cylindrical passage which measured 1.27 cm (0.5 inch) in diameter and 0.64 cm (0.25 inch) in length and was connected to the bottom of the cell cavity. The spinneret cavity contained stainless steel filters of the following mesh sizes, inserted in the following order, starting from the bottom (i.e., closest to the exit): 50, 50, 325, 50, 200, 50, 100, and 50. A compressible annular aluminum seal was fitted to the top of the "stack" of filters. Downstream of the filters was a cylindrical passage of about 2.5-cm (1-inch) length and 0.16-cm (1/16 inch) interior diameter, the exit portion of which was tapered (at an angle of 60 degrees to the axis) to meet with a final outlet orifice measuring 0.069 cm (0.027 inch) in length and 0.023 cm (0.009 inch) in inside diameter. A separate annular heater was used to control spinneret temperature. Cell temperature usually was no more than about 10° C. higher than the spinneret temperature.

Elastomer samples were cut into small pieces and dried for 1 to 2 days at 110° C. under nitrogen in a vacuum oven. Dry pieces, weighing a total of about 20 grams, were placed in the above-described cell, which had been preheated to a temperature of about 100° C. and maintained under a stream of dry nitrogen. A pressure of about 34,500 kPa (5,000 psig) was applied to the sample and cell and spinneret temperatures were raised until a filament began to extrude. Then, temperatures were raised further until the molten filament no longer exhibited melt fracture (as indicated by its ability to be drawn 4× at a throughput of about 0.5 gram per minute). The temperature was usually about 200° C. At that throughput, the filament sample was forwarded in succession to (a) a take-up roll located 3 feet (0.91 meters) below the spinneret and rotating at 40 meters/min, on which four wraps of filament were made, (b) a draw roll, the speed of which was increased to provide a desired draw ratio (usually 2 or 3×), and around which four wraps of filament were made, and (c) a bobbin, which revolved slightly slower than the draw roll, and upon which the filament was wound. Although a finish to prevent interfilament adhesion could be applied to the filament before, or as, it arrived at the take-up roll, no filaments of the invention required such a finish when the elastomer was melt-spun at a throughput of 0.5 gram/minute. In contrast, filaments having 2GT hard segments, but no —Q— units, required such a finish.

EXAMPLE I

This example compares filaments of elastomers of the invention (Sample 1) having 2GT hard segments amounting to 21.7% of the elastomer weight, copolymer soft segments of PO2/PO4-G (50/50) of 1,950 number average molecular weight, elastomer chains that contain —Q— units derived from p-phenylene-bis-(N-trimellitimide) amounting to 1.1% of the elastomer weight against filaments of almost identical elastomers from which the —Q— units were omitted (Comparison Sample A). The structural formula for the —Q— unit is depicted in Formula I above. The results of the comparison are further summarized in Table I and FIG. 1.

The following ingredients were used to prepare the elastomers of Sample 1 and Comparison A, except that ingredients of Sample 1 additionally included 0.5 gram of p-phenylene-bis-(N-trimellitimide):

| | |
|---|---|
| 31.0 | grams of PO2/PO4-G, a 50/50 molar copolymer of 1,950 number average molecular weight. |
| 11.7 | grams of dimethyl terephthalate (DMT). |
| 0.15 | gram of Antioxidant 330. |
| 10.0 | grams of ethylene glycol. |
| 1.5 | cm³ of a 5 weight % solution of tetrabutyl titanate (TBT) catalyst in n-butanol. |
| 1.0 | cm3 of a 1 weight percent solution of butyl stannoic acid (BSA) in methanol. |

The ingredients were charged to the kettle and heated to a temperature of 244° C. for about 45 minutes, during which time the ingredients were stirred and methanol distilled from the mix. Pressure on the system was then reduced to 0.1 mm of mercury over the course of about two hours. Distillation was continued at the reduced pressure for about one hour. The resulting viscous molten product was removed from the kettle and allowed to cool. Sample 1 and Comparison Sample A were both polymerized by this method, except that the initial time period before application of vacuum was increased to about two hours to allow time for the p-phenylene-bis-(N-trimellitimide) of Sample 1 to dissolve. The inherent viscosity of Sample 1 was 1.71 and of Comparison A, 1.60. Filaments prepared from the elastomers were drawn 2×. Filament properties are summarized in Table 1. Stress-strain characteristics of the filaments (1 vs. A) are compared in FIG. 1.

TABLE 1

(Example I)

HS = 21.7%, 2GT
SS = PO2/PO4-G (50/50) of 1950 MW
—Q— = 1.1% of a residue derived from p-phenylene-bis-(N-trimellitimide)
DR = 2X

| Sample Identification | Comparison A | Invention 1 |
|---|---|---|
| Weight % —Q— units | none | 1.1 |
| Tenacity, T, grams/den | 0.15 | 0.39 |
| Break Elongation, $E_b$, % | 954 | 594 |
| Unload Power at 100%, UP, mg/den | 14.8 | 23.9 |
| % Set | 46 | 30 |

Figure 1:
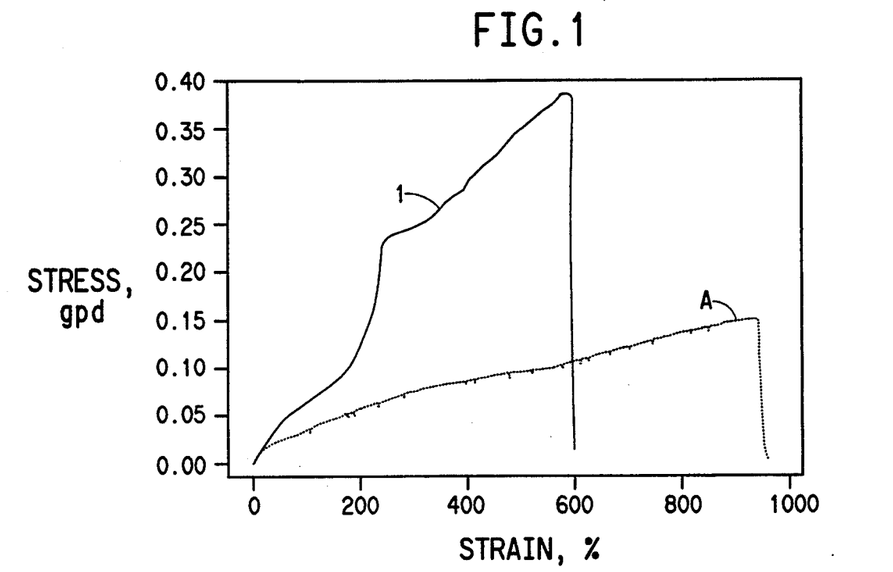
FIG. 1-9 are graphs that show the advantageous stress-strain properties of elastomers having hard segments that include —Q— units in accordance with the invention (solid lines) over substantially the same elastomers without such —Q— units (dotted lines).

Table 1 demonstrates that elastomeric filaments of Sample 1 of the invention are superior in tenacity, unload power and set as compared to the elastomeric filaments of Comparison A. Filaments of Sample 1 also were much less tacky than filaments of Comparison A. FIG. 1 shows that the —Q— units significantly increase the strength of the as-spun filaments at elongations below the break elongation.

EXAMPLE II

This example compares filaments of elastomers of the invention (Sample 2) having 2GT hard segments amounting to 22.5% of the elastomer weight and copolymer soft segments THF/MeTHF (92/8 by weight) of 2,450 number average molecular weight, the elastomer containing —Q— units derived from p-phenylene-bis-(N-trimellitimide) amounting to 1.1% of the elastomer weight with filaments of almost identical elastomers from which the —Q— units were omitted (Comparison Sample B). The results of the comparison are summarized in Table II. The procedures of Example I were repeated, with the below-listed ingredients (Sample 2 ingredients additionally included 0.5 gram of p-phenylene-bis-(N-trimellitimide). Sample 2 had an inherent viscosity of 1.62; Comparison B, 1.63.

| | |
|---|---|
| 30.0 | grams of copolymerized THF/MeTHF (92/8 by weight) |
| 11.4 | grams of DMT. |
| 0.15 | gram of AO 330. |
| 10.0 | grams of ethylene glycol. |

-continued

| | |
|---|---|
| 2.0 | cm3 of a 1 weight % BSA solution. |

Table 2, below, summarizes the properties of the resultant filaments and demonstrates, as did Example 1, that filaments of the invention (Sample 2) are superior in unload power and set (i.e, higher UP and lower set) to those of Comparison B. Also, filaments of Sample 2 with —Q— units in the molecular chains of the elastomer were less tacky than Comparison B filaments which had no such —Q— units in the elastomer.

TABLE 2

(Example II)

HS = 22.5%, 2GT
SS = THF/MeTHF (92/8 by weight) of 2,450 MW
—Q— = 1.1% of a residue derived from p-phenylene-bis-(N-trimellitimide)
DR = 2X

| Sample Identification | Comparison B | Invention 2 |
|---|---|---|
| Weight % —Q— units | none | 1.1 |
| Tenacity, T, grams/den | 0.58 | 0.47 |
| Break Elongation, $E_b$, % | 412 | 429 |
| Unload Power at 100%, UP, mg/den | 16.6 | 19.7 |
| % Set | 45 | 35 |

EXAMPLE III

In this example, filaments of elastomers of the invention, Samples 3 and 4, and Comparison Sample C have 2GT hard segments amounting to 24.0% of the elastomer weight and PO4G soft segments of 2,000 number average molecular weight. The elastomer chains of the samples of the invention contain —Q— units amounting to 1.1% of the elastomer weight. In Sample 3, the —Q— units are derived from p-phenylene-bis-(N-trimellitimide) and in Sample 4, from the di-D-butyl ester of 1,2-ethylene-bis-(N-trimellitimide) which is formed by the reaction of one mole of ethylene diamine (EDA) with two moles of the n-butyl ester of trimellitic acid anhydride (TMA). Sample C has no —Q— units. Filament samples were drawn 2× or 3×, as indicated in summary Table 3 below. The drawn samples were also subjected to a boil-off heat treatment for about a half hour. Elastic properties of the resultant filaments are recorded in summary Table 3.

The procedures of Example I were repeated, with the additional boil-off step and with the ingredients listed below. Samples 3 and 4 each additionally included 0.5 gram of —Q— unit ingredients. Inherent viscosities of Samples 3, 4 and C were 1.61, 1.73 and 1.87, respectively.

| | |
|---|---|
| 31.0 | grams of PO4G of about 2,000 molecular weight. |
| 11.7 | grams of DMT. |
| 0.15 | gram of AO 330. |
| 10.0 | grams of ethylene glycol. |
| 1.5 | cm³ of a 5 weight % TBT solution. |
| 1.0 | cm3 of a 1 weight % BSA solution. |

TABLE 3

(Example III)

HS = 24.0%, 2GT
SS = PO4G of 2,000 MW
—Q— = Sample 3: derived from p-phenylene-bis-(N-trimellitimide)
Sample 4: derived from TABLE 3-continued (Example III)

bis-trimellitimide of EDA
Sample C: none

| Sample Identification | C | 3 | 4 | C |
|---|---|---|---|---|
| Q— units, weight % | none | 1.1 | 1.1 | none |
| DR | 2X | 2X | 3X | 3X |
| A. As-drawn filaments | | | | |
| T, g/den | 0.68 | 0.73 | 1.23 | 1.11 |
| $E_b$ %* | 297 | 273 | 311 | 303 |
| $UP_{100}$, mg/den | 34.1 | 35.2 | 18.9 | ** |
| % Set | 19 | 21 | 56 | ** |
| B. Boiled-off filaments | | | | |
| T, g/den | 0.53 | 0.56 | 0.63 | 0.67 |
| $E_b$ %* | 439 | 394 | 496 | 567 |
| $UP_{100}$, mg/den | 16.1 | 16.0 | 17.7 | 16.9 |
| % Set | 31 | 32 | 24 | 25 |

Notes
*For UP measurements, as-drawn filaments of Samples 3 and C were subjected to 0-200% extension cycles; all other samples, to 0-300% cycles.
**Could not be measured; sample broke.

Figure 2:
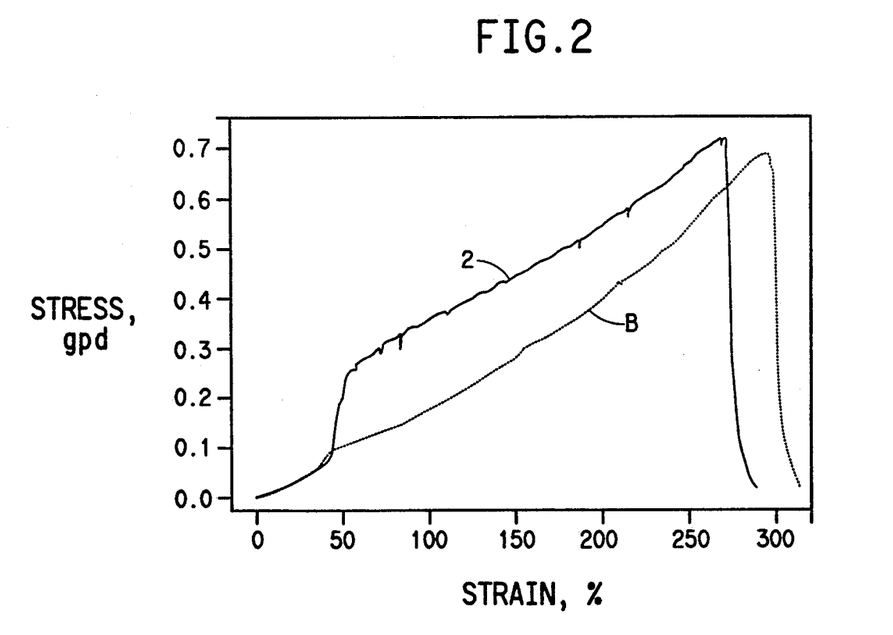
Figure 3:
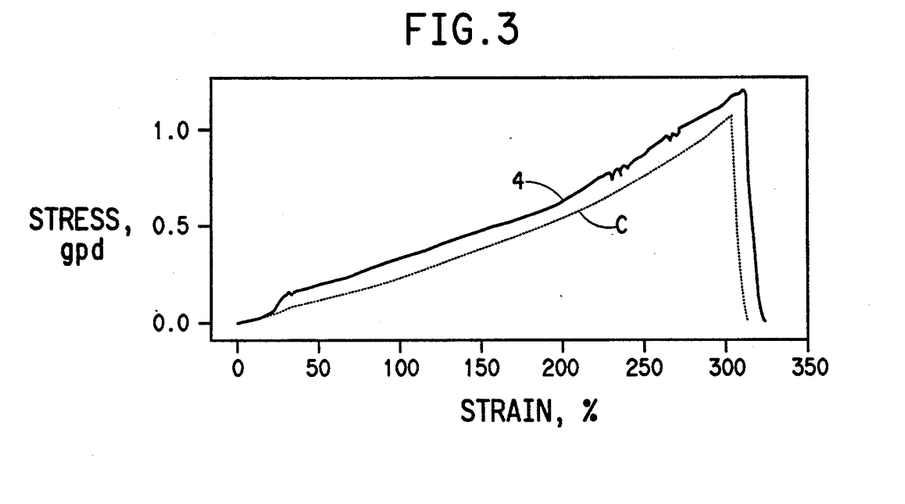
Figure 4:
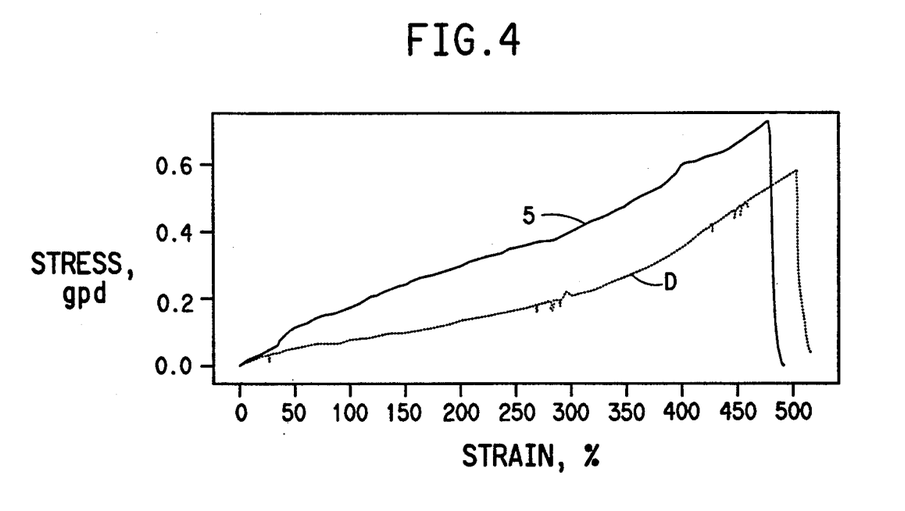
Figure 5:
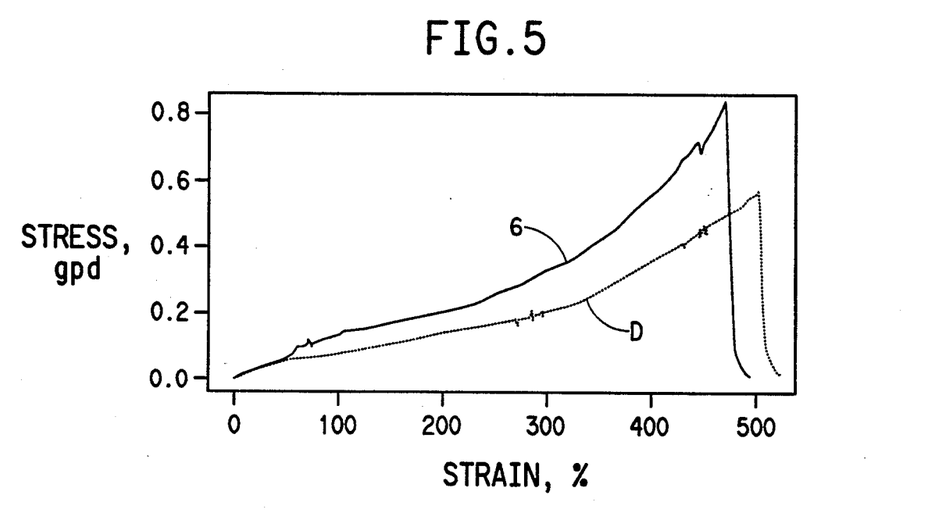
Figure 6:
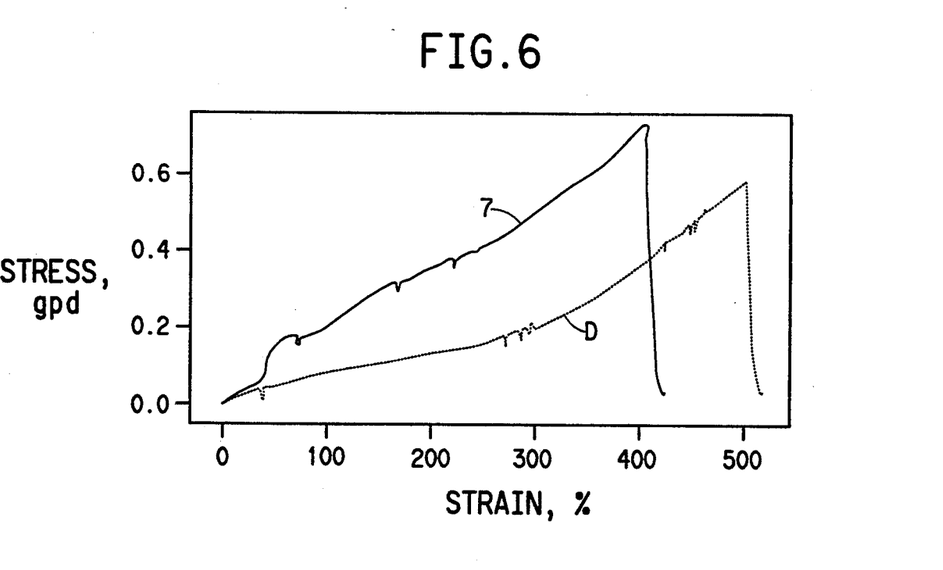
Figure 7:
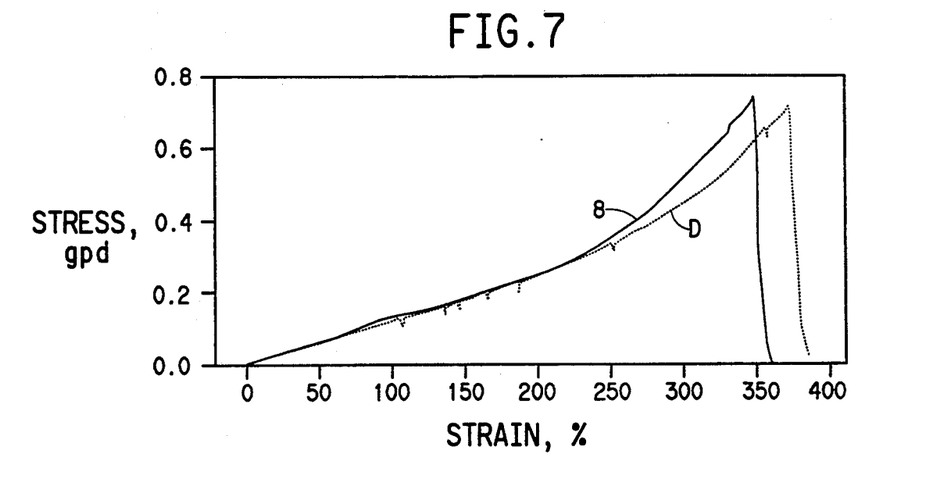

Table 3 shows that the presence of —Q— units in these elastomers having 2GT hard segments (24%) and PO4G soft segments has very little effect on the elastic properties of tenacity, unload power and set. However, the presence of —Q— units greatly decrease the tackiness of the filaments. Furthermore, as shown by the stress-strain diagram of FIG. 2 for Sample 3 versus Comparison Sample C (both drawn 2×), at elongations below the break elongation, the strength of the filaments is much greater for the elastomer Samples containing —Q— units in accordance with the invention. FIG. 3, for Sample 4 versus Sample C (both drawn 3×), also shows that the —Q— units provide some improvement in the stress-strain properties at elongations below the break elongation for Sample 4, but not as great an improvement as in Sample 3 versus the comparison sample.

EXAMPLE IV

In this example, filaments of elastomers of the invention, Samples 5, 6, 7 and 8, and a Comparison Sample D have 4GT hard segments amounting to 17.1% of the elastomer weight and PO4G soft segments of about 2,000 number average molecular weight. The elastomers of the samples of the invention contain —Q— units amounting to 1% of the elastomer weight. In Sample 5, the —Q— units are derived from p-phenylene-bis-(N-trimellitimide); in Sample 6, from p-phenylene-bis-(N-trimellitimide), added as the di-n-butyl diester; in Sample 7, from m-phenylene-bis-(N-trimellitimide); and in Sample 8, from 1,2-ethylene-bis-(N-trimellitimide). The elastomer of Sample D has no —Q— units. Filament samples were drawn 2× or 3×, as indicated in summary Table 4 below. The drawn samples were immersed in boiling water for about a half hour. Elastic properties of the resultant filaments are summarized in Table 4.

To prepare the samples of this example, the general procedures of Example I were repeated, with the additional boil-off step, and with the ingredients listed below. Each of Samples 5, 6, 7 and 8 additionally included an amount of —Q— unit ingredient that resulted in a 1% concentration of —Q— units in the elastomer. Inherent viscosities of Samples 5, 6, 7, 8 and D were 1.83, 2.13, 1.84, 1.93 and 1.85, respectively.

| | |
|---|---|
| 29.1 | grams of PO4G of about 2,000 molecular weight |
| 12.5 | grams of DMT |
| 0.15 | gram of AO 330 |
| 10.0 | grams of 1,4-butanediol |
| 1.0 | cm3 of a 5 weight % TBT solution |

TABLE 4

(Example IV)

HS = 17.1% 4GT
SS = PO4G of 2,000 MW

| Sample | —Q— units derived from |
|---|---|
| 5 | p-phenylene-bis-(N-trimellitimide) |
| 6 | p-phenylene-bis-(N-trimellitimide) added as the di-n-butyl diester. |
| 7 | m-phenylene-bis-(N-trimellitimide) |
| 8 | 1,2-ethylene-bis-(N-trimellitimide) |
| D | none |

| Sample | D | 5 | 6 | 7 | 8 | D |
|---|---|---|---|---|---|---|
| Wt % —Q— | none | 1 | 1 | 1 | 1 | none |
| DR | 2 | 2 | 2 | 2 | 3 | 3 |
| As-drawn filaments | | | | | | |
| T | 0.57 | 0.75 | 0.83 | 0.69 | 0.74 | 0.72 |
| % $E_b$ | 502 | 476 | 476 | 407 | 347 | 373 |
| UP$_{100}$ | 14.0 | 12.1 | 15.5 | 13.7 | 12.4 | 11.3 |
| % Set | 41 | 43 | 37 | 40 | 38 | 47 |
| Boiled-off filaments | | | | | | |
| T | 0.33 | 0.39 | 0.49 | 0.46 | 0.33 | 0.36 |
| % $E_b$ | 674 | 600 | 710 | 654 | 558 | 628 |
| UP$_{100}$ | 11.6 | 12.7 | 15.0 | 14.5 | 17.2 | 12.1 |
| % Set | 33 | 32 | 34 | 26 | 26 | 26 |

Table 4 shows that the effect on as-drawn (2×) filament properties of —Q— units in the elastomers of having 4GT hard segments (17.1%) and PO4G soft segments was to increase tenacity, but to affect unload power or % Set very little. The —Q— units in the elastomers of the boiled-off filaments that were drawn 2× (before boil-off) increased tenacity and unload power of the filaments but had little effect on % Set. —Q— units in the elastomers of as-drawn filaments of 3' draw had little effect on tenacity, but increased unload power and decreased % Set. —Q— units of elastomers of boiled-off 3×-drawn filaments had little effect on tenacity and % Set, but increased unload power. In all cases, however, as shown by the stress-strain diagrams of FIGS. 4–7, the presence of —Q— units in these elastomers substantially increased the load power at elongations below $E_b$. In addition, —Q— units derived from the bis-(N-trimellitimide) of the diamine H$_2$N$\phi$-C(CH$_3$)$_2$-$\phi$C(CH$_3$)$_2$-$\phi$NH$_2$, where $\phi$=p-phenylene-, were found to substantially increase load power at elongations below $E_b$ in these elastomers.

EXAMPLE V

Figure 8:
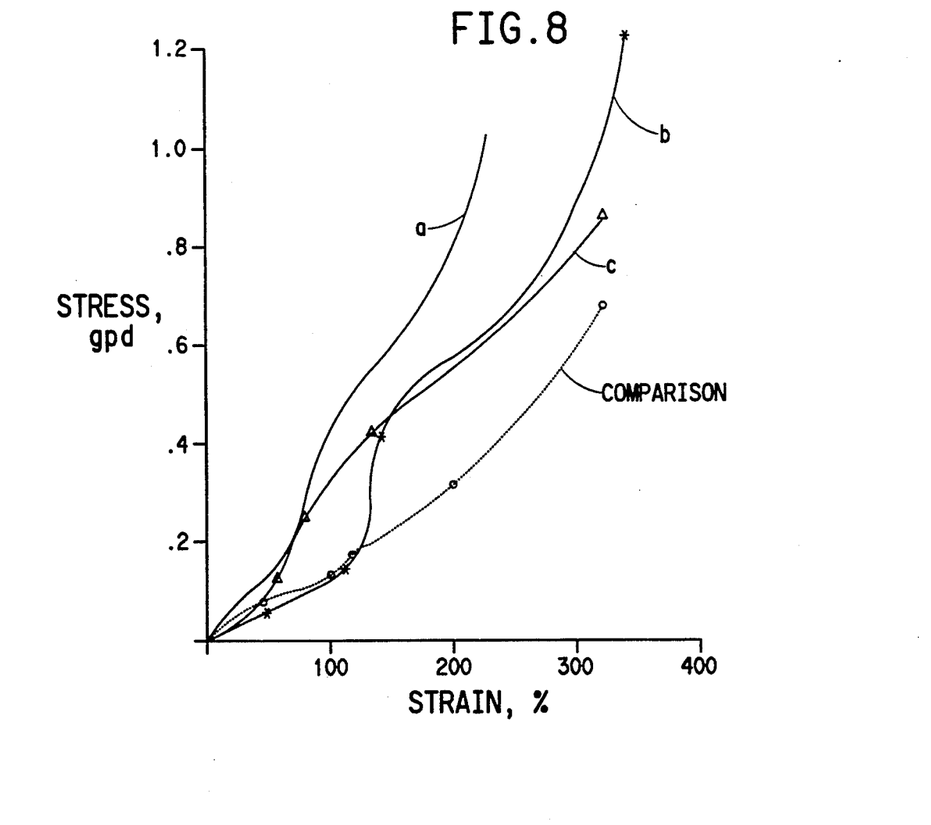

In this example, the stress-strain characteristics of three sets of filaments of the invention made from elastomers having 4GT hard segments amounting to 24% of the elastomer weight, —Q— units amounting to 1% of the elastomer weight and PO4G soft segments of about 2,000 molecular weight were compared in FIG. 8 to filaments of the same composition having no —Q— units. In FIG. 8, filaments with —Q— units derived from t-1,4-cyclohexylene-bis-(N-trimellitimide) are labeled "a"; from p-phenylene-bis-(N-trimellitimide), "b"; and from the imide diacid derived from reaction of one molecule of trimellitic anhydride and p-aminobenzoic acid, "c". Stress-strain curves of filaments having no —Q— units are indicated by dashed lines in the FIG. 8.

The figure shows that at a draw ratio of 4×, the presence of each of the above described —Q— units greatly increased the strength of the as-spun filaments at elongations below the break elongation. This effect was observed at all draw ratios.

EXAMPLE VI

Figure 9:
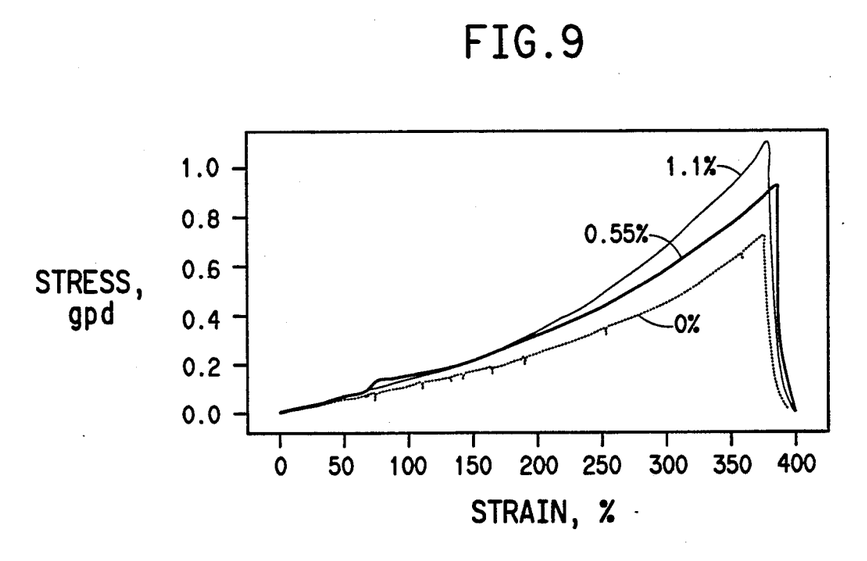

This example illustrates the effect of concentration of —Q— units in filaments prepared from elastomers having 17.1% 4GT hard segments and PO4G soft segments of 2,000 molecular weight and compares such filaments of the invention to filaments of the same composition, but without —Q— units. The filaments had 0.0, 0.55 or 1.1% concentration of —Q— units (by weight of the elastomer) derived from the di-n-butyl diester of p-phenylene-bis-(N-trimellitimide). FIG. 9 shows that in filaments drawn 3×, the effect of the —Q— units was to substantially increase the strength of the as-drawn filaments at elongations below $E_b$, approximately in proportion to the amount of —Q— unit incorporated.

EXAMPLE VII

In this example, filaments of elastomers of the invention, Samples 9 and 10 have 4GT hard segments amounting to 17.9% of the elastomer weight and THF/MeTHF (85/15 by weight) soft segments of 1885 number average molecular weight. Each of elastomer Samples 9 and 10 contains —Q— units derived from the di-n-butyl diester of p-phenylene-bis-(N-trimellitimide); amounting to 0.55% of the elastomer weight in Sample 9 and 1.1% in Sample 10. Sample 9 also contains about 1.1% of an inert residue derived from dimethyl-2,6-naphthalenedicarboxylate. Filament samples were drawn 2×, as indicated in summary Table 5 below. The drawn samples were also subjected to a boil-off treatment for about a half hour. Elastic properties of the as-drawn and boiled-off filaments are summarized in Table 5.

TABLE 5

(Example VII)

HS = 17.9% 4GT
SS = THF/MeTHF (85/15 by weight) of 1885 MW
—Q— = Derived from the di-n-butyl diester of p-phenylene-bis-(N-trimellitimide)

| Sample | 9 | 10 |
|---|---|---|
| Wt % —Q— | 0.55 | 1.1 |
| DR | 2 | 2 |
| As-drawn filaments | | |
| T | 0.30 | 0.39 |
| $E_b$ | 586 | 507 |
| UP100 | 19.4 | 20.2 |
| % Set | 43 | 40 |
| Boiled-off filaments | | |
| T | 0.22 | 0.26 |
| $E_b$ | 723 | 665 |
| UP | 14.1 | 16.3 |
| % Set | 39 | 39 |

Table 5 shows that increased amounts of —Q— units in as-drawn (2×) elastomers of this example (i.e., those having 17.9 weight % 4GT hard segments and THF/MeTHF (85/15 by weight) soft segments of about 1,885 molecular weight) increased filament tenacity, increased unload power and decreased % Set. In the boiled-off, 2×-drawn filaments, the increased amount of the —Q— units in the elastomer increased filament tenacity and increased unload power, but had no effect on % Set.

EXAMPLE VIII

This example illustrates the formation of —Q— units in-situ elastomers of the invention having 2GT or 4GT hard segments.

Filaments were prepared from elastomer having 2GT hard segments amounting to 26% of the elastomer weight and PO2/PO4-G (50/50) soft segments of about 1,950 molecular weight. —Q— units amounting to 1% of the elastomer weight were formed in situ during the polymerization of the elastomer. The —Q— units were derived from the reaction of a 1:2 molar ratio of trans-cyclohexanedimethanol and DMT. Elastomers were also prepared of the same composition but having 1% of the —Q— units derived from the in-situ reaction of a 1:2 molar ratio of bis-(N-ethanolphthalimide)ketone and DMT. Filaments were spun of the elastomers with these —Q— units and with no —Q— units. The effect of the —Q— units generated in-situ was to substantially increase the strength of the as-drawn filaments at elongations below $E_b$ at all draw ratios.

Filaments were also prepared from an elastomer having 4GT hard segments amounting to 17.1% of the elastomer weight and PO4G soft segments of about 2,000 molecular weight and having (a) no —Q— units and (b) 1% of —Q— units generated in situ by the reaction of a 1:1 molar ratio of p-aminobenzoic acid and DMT (Sample 13). With this elastomer also, the —Q— units generated in-situ substantially increased the strength of the as-drawn filaments at elongations below $E_b$ at all draw ratios.

I claim:

1. A thermoplastic, segmented, linear copolyetherester elastomer which consists essentially of a multiplicity of recurring intralinear long-chain and short-chain ester units connected head-to-tail through ester linkages, the long-chain ester units amounting to at least 70 percent by weight of the elastomer and being poly(alkylene oxide)terephthalate units and the short-chain ester units amounting to 10 to 30 percent by weight of the elastomer and being units of poly(1,2-ethylene terephthalate) or poly(1,4-butylene terephthalate), characterized in that the hard segments include difunctional organic units —Q—, in an amount in the range of 0.1 to 2 percent of the total elastomer weight, and —Q— is selected from the group consisting of (a), (b), (c), (d), (e) and (f) units wherein (a) is a structural unit —Y—X—Z—, wherein —Y— and —Z— are the same or different and are selected from the divalent radicals and —X— is a divalent organic radical consisting of a chain of at least three ring structures, optionally connected by trans-amide, carbonyl, trans-vinylene, azo or azomethine linkages, having a shortest distance of at least 11 Angstroms between centers of its terminal junctions, as measured from a Dreiding model laid flat, and when —X— is in the compound the compound exhibits a melting point of at least 225° C., (b) is a bis-(N-trimellitimide) of the structural formula —G—R—G— wherein G is a divalent trimellitimide unit and R is selected from
(CH2)n wherein n is 0, 1 or 2,
m-phenylene,
dimethyl-di--phenylenemethane, and (c) a divalent residue of the reaction of a 1:2 molar ratio of trans-1,4-cyclohexanedimethanol and dimethylterephthalate, (d) a divalent residue of the reaction of a 1:2 molar ratio of bis-(N-ethanolphthalimide)ketone and dimethylterephthalate, (e) a divalent residue of the reaction of a 1:1 molar ratio of p-aminobenzoic acid and dimethylterephthalate, and (f) a divalent residue of the reaction of a 1:1 molar ratio of p-aminobenzoic acid and trimellitic anhydride.

2. An elastomer in accordance with claim 1 wherein the —Q— units amount to 0.5 to 1.5% of the total elastomer weight.

3. An elastomer in accordance with claim 2 wherein the —Y—X—Z— unit is p-phenylene-bis-(N-trimellitimide).

4. An elastomer in accordance with claim 2 wherein the —Y—X—Z— unit is trans-cyclohexylene-bis-(N-trimellitimide).

5. A fiber or film of the elastomer of claim 1.